March 1, 1966 G. SCHUBACK 3,237,774
APPARATUS FOR SKIMMING THE SCUM, ESPECIALLY OIL
LAYERS, FROM WATER SURFACES
Filed March 7, 1963 2 Sheets-Sheet 1
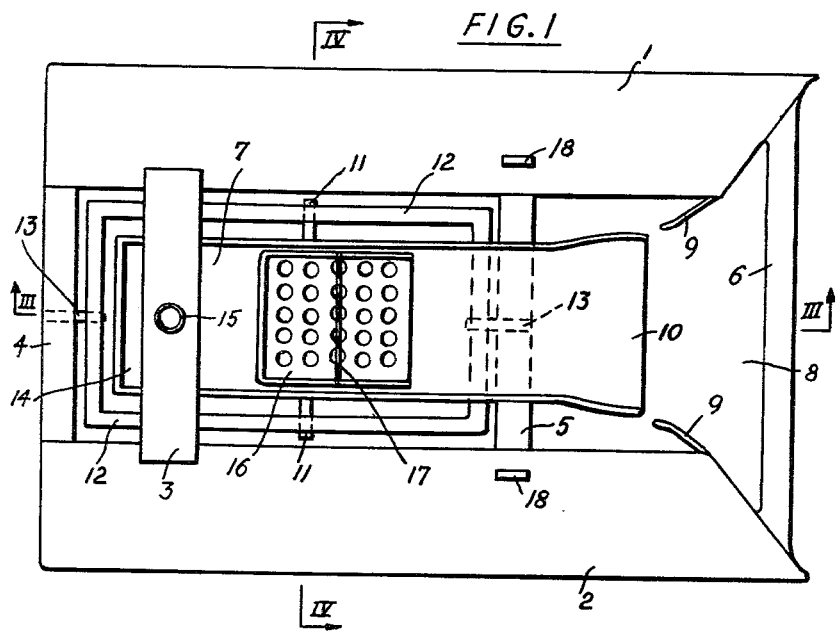
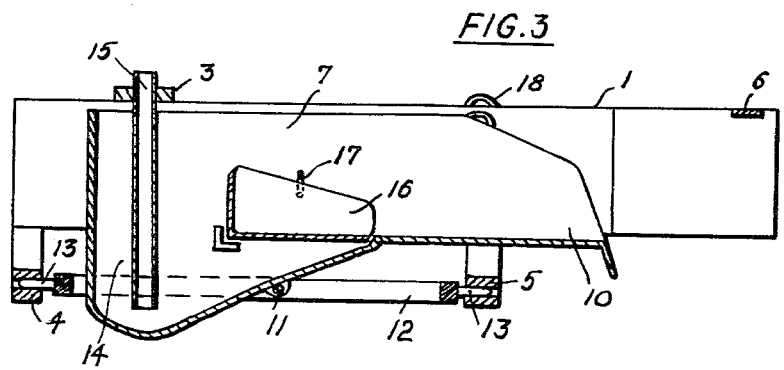
INVENTOR
Georg Schuback
By Lowry & Rinehart
ATTYS.

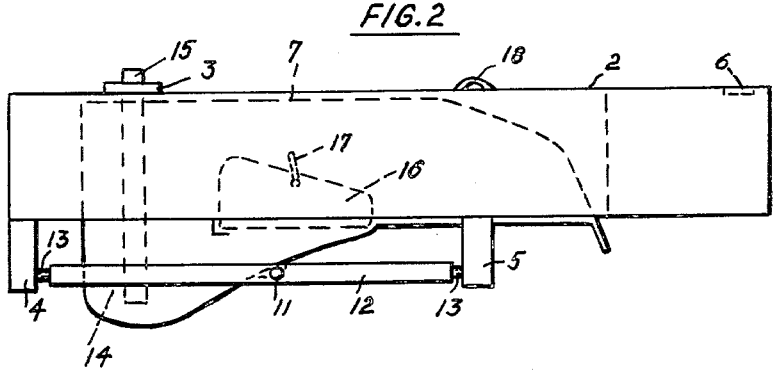
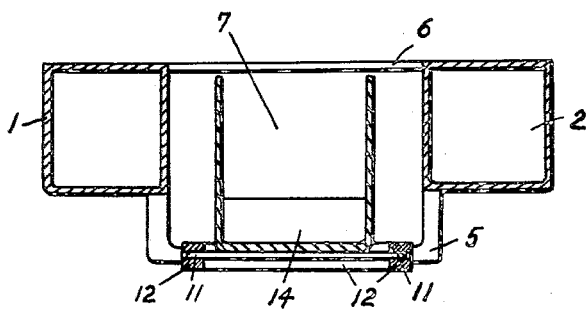

United States Patent Office 3,237,774
Patented Mar. 1, 1966

3,237,774
APPARATUS FOR SKIMMING THE SCUM, ESPECIALLY OIL LAYERS, FROM WATER SURFACES
Georg Schuback, Hamburg-Blankenese, Germany, assignor to Rudolf Harmstorf, Hamburg, Germany
Filed Mar. 7, 1963, Ser. No. 263,490
Claims priority, application Germany, Mar. 20, 1962, Sch 31,149
5 Claims. (Cl. 210—242)

This invention relates to an apparatus for skimming the scum, especially oil layers, from water surfaces and consists of a collecting tank connected to floats.

Such skimming apparatuses are known. They consist of a collecting tank with a floating body concentrically surrounding it. It is also known to arrange the collecting tank floating and separately from the floating body and to guide the vertical movement of the collecting tank according to its contents through the floating body.

The known skimming apparatuses operate with flaps which regulate the inflowing scum and whose hinges are at the level of the water surface. But such flaps are disadvantageous in that they are liable to become sluggish and may stick owing to viscous oil such as heavy fuel oil. During heavy swells the collecting tank will heel and take up large quantities of water, in addition to the oil layer.

To avoid these disadvantages and to ensure a reliable operation also in case of swells the invention provides an apparatus for skimming the scum, especially oil layers, from water surfaces, which comprises two floats forming a channel therebetween, a collecting tank connected to the floats and suspended on gimbals in said channel, and a bailer of shovel-like design provided on said collecting tank and directed towards one end of said channel.

A guiding channel for the collecting tank may be formed by the floats at the skimming side of the apparatus, the guiding channel narrowing down towards the bailer.

Preferably a frame may be provided for mounting the collecting tank therein transversely to the direction of skimming and the frame may be rotatably suspended between the floats on pins extending in the direction of skimming. The collecting tank may be provided adjacent the bailer with a collecting receptacle which extends into the water.

According to a preferred embodiment of the invention a suction pipe adapted to be connected to a pump may be secured directly or indirectly to the floats and extend into the collecting receptacle of the tank. Advantageously a removable collecting basket having a perforated bottom and intended for intercepting solid floating substances may be inserted in the collecting tank.

A preferred embodiment of the invention will now be described by way of example and with reference to the accompanying drawings, in which:

FIG. 1 is a top plan view on a skimming apparatus according to the invention;

FIG. 2 is a side elevational view of the apparatus;

FIG. 3 is a longitudinal section taken on the line III—III of FIG. 1; and

FIG. 4 is a cross section taken on the line IV—IV of FIG. 1 without the collecting basket.

FIG. 1 shows floats 1 and 2 with a channel between them. The floats are kept apart by bars 3, 4, 5, and 6 and a collecting tank 7 is suspended on gimbals between the floats. One end of the floats 1 and 2 forms a guiding channel 8 for the collecting tank 7. Baffle plates 9 complete the guiding channel 8.

One end of the collecting tank 7 is provided with a bailer 10 which when the skimming apparatus is floating in water rests substantially on the surface of the water. The collecting tank 7 is pivoted on pins 11 in a frame 12 transversely to the direction of skimming. The frame 12 is rotatable about pins 13 which extend in the direction of skimming so that a suspension on gimbals is provided for the collecting tank 7. The pins 13 are supported in the bars 4 and 5.

The collecting tank 7 is provided adjacent the bailer 10 with a collecting receptacle 14 extending into the water. A suction pipe 15 of a pump, mounted on the floats 1 and 2 by means of the bar 3, extends into this collecting receptacle 14 so that the latter can easily be emptied. The pump (not shown) may be adjusted so that it is able to continuously remove the contents of the tank 7.

A collecting basket 16 having a perforated bottom and intended for intercepting solid floating substances is insertable in the collecting tank 7 so that these solid floating substances cannot enter the collecting receptacle 14 of the tank 7. The collecting basket 16 can be emptied by withdrawing it by the handle 17.

For skimming the scum from a water surface the apparatus is operated either through its own power drive or by pumping vessels to the side of which the scoop may be preferably fixed. However, it is also possible to anchor the apparatus in flowing water so that the flowing water will reach the bailer 10 of the collecting tank 7 and the scum is skimmed from the water surface. Owing to the suspension on gimbals of the tank 7 it will always stay level with the water surface; the overflow level can be determined to fractions of an inch in accordance with the thickness of the oil layer, irrespective of whether the floats will roll or pitch because of swells. The apparatus can be put out of service by taking the bailer 10 of the collecting tank 7 out of the water. The collecting tank is then secured to clamps 18. Sticking of the suspension on gimbals of the collecting tank 7 through viscous oil upon the water surface cannot take place, for the suspension on gimbals is beneath the water surface.

Every size of the oil skimming apparatus with its suspension on gimbals can also be mounted and used in oil separators as well as an accessory device for a suction equipment and with a conveyor line system.

This apparatus need not be moved to its place of operation by a derrick and hoist and is always ready for use.

A pumping equipment can be directly mounted on the skimming apparatus.

I claim:
1. In a skimming apparatus for liquid separation, the combination comprising a collecting tank to skim a top layer of liquid from a bottom layer of liquid, buoyant means on each side of said collecting tank to float said collecting tank, means spacing each said buoyant means from one another, and a frame means interposed between said collecting tank and each said buoyant means to maintain said collecting tank in a substantially horizontal position, said collecting tank being freely swingable relative to said frame means by a first horizontal pivot means journaled between said frame means and said collecting tank, said frame means being freely swingable relative to each said buoyant means by a second horizontal pivot means normal to said first horizontal pivot means and journaled between said spacing means and said frame means, whereby because of the free relative movement resulting between each said buoyant means and said collecting tank, said collecting tank is maintained substantially horizontal irrespective of the pitch or roll of each said buoyant means.

2. Apparatus as defined in claim 1 wherein each said buoyant means forms a feed channel at one end for said collecting tank, each said buoyant means having guide means attached thereto at the inlet of the feed channel to funnel the liquid to be skimmed to the collecting tank.

3. Apparatus as defined in claim 1 wherein said collecting tank has a floor portion which is maintained at a desired level within the top layer of liquid, and a depending receptacle portion at one end of said floor portion to collect the skimmed top layer of liquid.

4. Apparatus as defined in claim 3 wherein said collecting tank has a bailer depending from the other end of said floor portion, said bailer when in the operative position extending forwardly in the direction of skimming into said feed channel and below said top layer of liquid.

5. In a skimming apparatus for liquid separation, the combination comprising a collecting tank to skim a top layer of liquid from a bottom layer of liquid, buoyant means on each side of said collecting tank to float said collecting tank, and a frame means interposed between said collecting tank and each said buoyant means to maintain said collecting tank in a substantially horizontal position, means spacing each said buoyant means from one another, said collecting tank having a floor portion which is maintained within the top level of liquid and a depending receptacle portion at one end of said floor portion to collect the skimmed layer of liquid, said depending receptacle portion having a suction means therein for removal of the skimmed top layer of liquid, said collecting tank being freely swingable relative to said frame means by a first horizontal pivotal means journaled between said frame means and said collecting tank, and said frame means being freely swingable relative to each said buoyant means by a second horizontal pivot means normal to said first horizontal pivot means and journaled between said frame means and said spacing means, whereby because of the free relative movement resulting between each said buoyant means and said collecting tank, said collecting tank is maintained substantially horizontal irrespective of the pitch or roll of each said buoyant means.

References Cited by the Examiner
UNITED STATES PATENTS

| | | | |
|---|---|---|---|
| 1,530,078 | 3/1925 | Haynes | 210—242 |
| 1,591,024 | 7/1926 | Dodge | 210—242 |
| 1,709,783 | 4/1929 | Etheredge | 210—242 |
| 2,119,775 | 6/1938 | Chase | 114—61 |
| 2,146,542 | 2/1939 | Hawley | 210—242 X |
| 2,497,177 | 2/1950 | McClintock et al. | 210—242 X |
| 2,608,300 | 8/1952 | Small | 210—242 X |
| 2,670,848 | 3/1954 | Van Houston et al. | 210—242 X |
| 2,876,903 | 3/1959 | Lee | 210—242 |
| 2,891,672 | 6/1959 | In't Veld et al. | 210—242 |
| 2,908,393 | 10/1959 | Lanphier | 210—242 |

REUBEN FRIEDMAN, *Primary Examiner.*

ROBERT F. BURNETT, *Examiner.*

J. L. DeCESARE, K. V. ROCKEY, *Assistant Examiners.*